United States Patent [19]
Goldman et al.

[11] 3,828,176
[45] Aug. 6, 1974

[54] SAFE UNDERWATER LIGHTING SYSTEM FOR AQUARIUMS

[75] Inventors: Marvin A. Goldman; Jerome N. Goldman, both of Great Neck, N.Y.

[73] Assignee: Penn-Plax Plastics, Inc., Jamaica, N.Y.

[22] Filed: Aug. 9, 1973

[21] Appl. No.: 386,988

[52] U.S. Cl................. 240/2 LC, 119/5, 240/10 R, 240/26
[51] Int. Cl.......................................... F21v 33/00
[58] Field of Search.......... 240/2 LC, 26, 1 R, 10 R; 119/5

[56] References Cited
UNITED STATES PATENTS

| | | | |
|---|---|---|---|
| 2,931,895 | 4/1960 | Wagenhauser | 240/26 |
| 3,326,185 | 6/1967 | Perez | 240/2 LC |
| 3,557,753 | 1/1971 | Dantoni | 119/5 |
| 3,563,204 | 2/1971 | Szilagyi | 119/5 |
| 3,622,777 | 11/1971 | Bovlo | 240/26 |
| 3,706,299 | 12/1972 | Hendges | 119/5 |
| 3,749,901 | 7/1973 | Clough | 240/2 LC |

*Primary Examiner*—Richard L. Moses
*Attorney, Agent, or Firm*—Mandeville and Schweitzer

[57] ABSTRACT

Disclosed herein is a lighting system for use within an aquarium for the purposes of safely illuminating and decorating the same. The new system includes a wall mounted transformer for reducing normal household current, i.e., 110–120 volt 60 cycle AC to 3–3.5 volt 60 cycle AC; a special low voltage terminal box means adapted to be self supporting on the upper edge of an aquarium wall; conductor means interconnecting the transformer and the terminal box means and having interposed therein a single "on-off" switch; a plurality of submersible miniaturized incandescent lamps each having a pair of elongated conductors projecting therefrom which conductors are adapted to be connected to a pair of terminals in the terminal box means for being energized by low voltage; and a telescoping channel means for retaining the lamp energizing conductors against the side of an aquarium wall. By virtue of the reduction of the voltage available at the terminal box to three volts, the system is totally safe and harmless. In the event of the accidental submersion of the terminal box or in the event of any other accidental shorting across the lamp terminals, the applied voltage is absolutely harmless and will not exceed 3–3.5 volts. Moreover, since the lamps are operated submerged in water, they are constantly cooled during operation, causing their effective life spans to be greatly increased, thereby substantially reducing the need for replacement.

9 Claims, 5 Drawing Figures

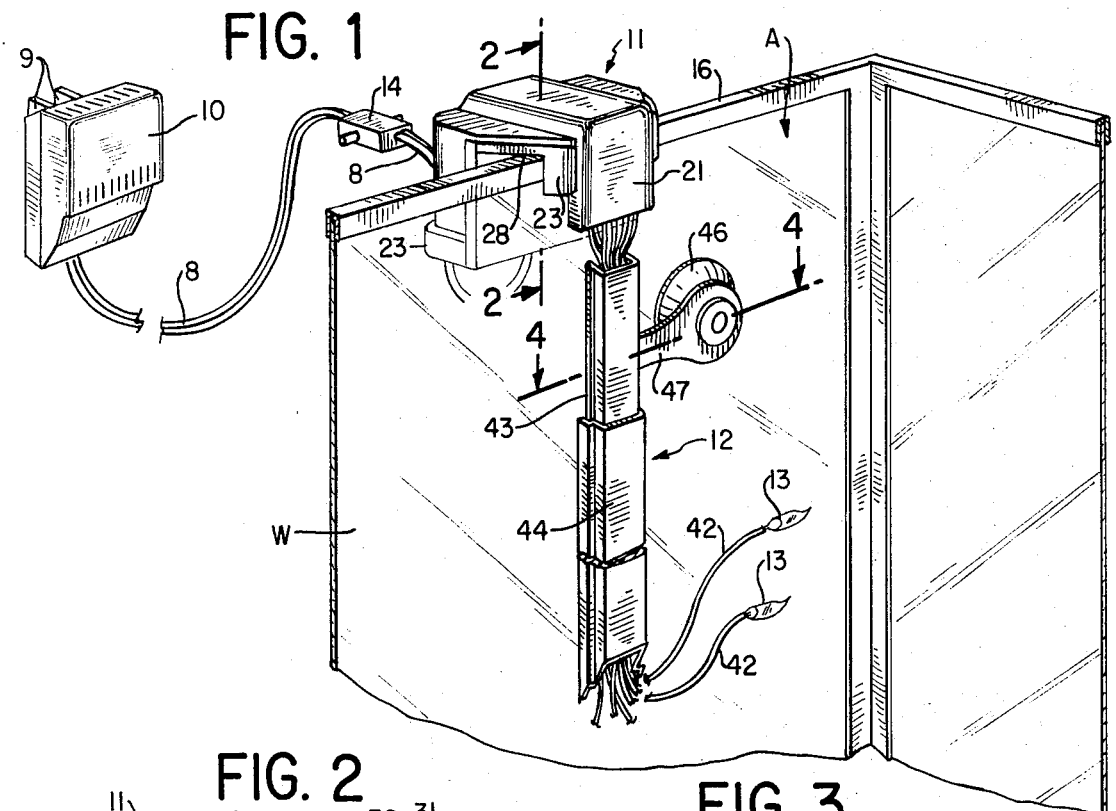
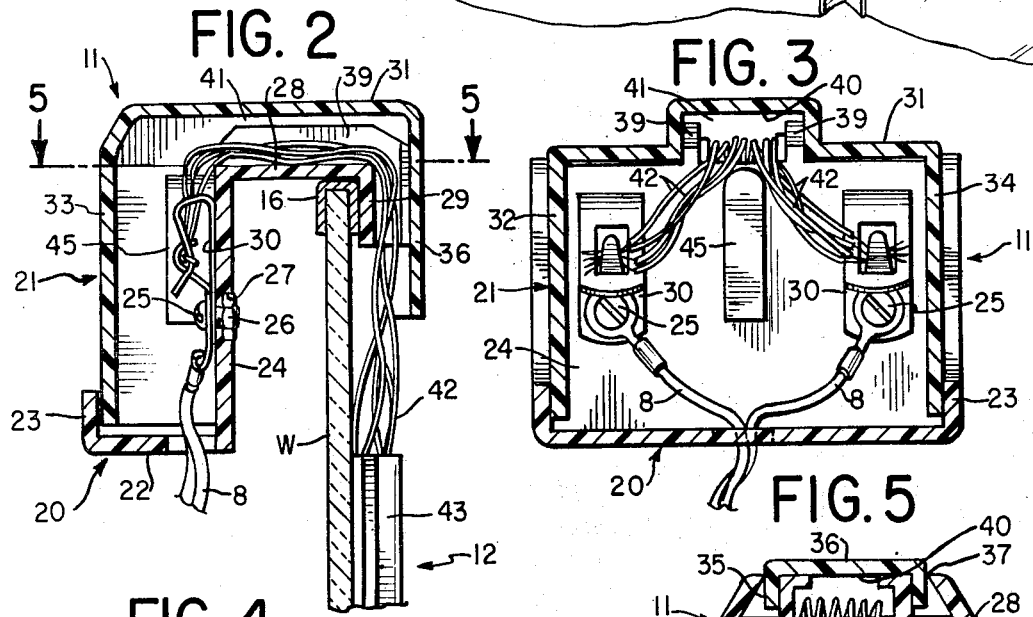
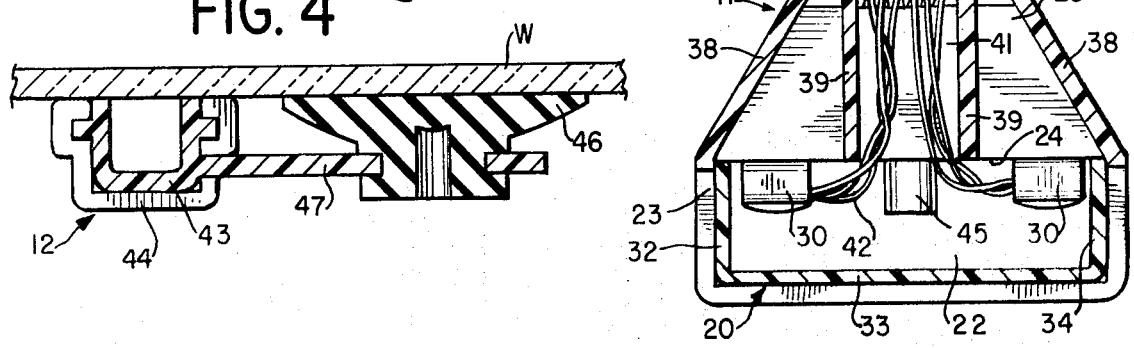

SAFE UNDERWATER LIGHTING SYSTEM FOR AQUARIUMS

BACKGROUND AND SUMMARY OF THE INVENTION

Aquariums have long been available to the general public for use in homes as both decorations and hobby items. Over the years numerous decorative and functional accessories for aquariums have been developed. These include, for example, three-dimensional backgrounds for mounting externally of the aquarium for viewing through the clear front wall; submersible ornaments, some of which are hydrodynamically driven to provide pleasing visual effects to an observer of the aquarium and filtering systems, and the like. In addition, various external lighting systems have been devised for directing light into an aquarium from sources immediately adjacent the water in the tank. However, none of the lighting systems available to the art employs a safe low voltage light source directly within the water itself, i.e., none has been submersible with total safety.

To the end of providing a completely reliable, completely safe underwater lighting system for home aquariums, a new and improved underwater lighting system has been developed. That system includes a special low voltage terminal box means for self-mounting directly on the upper edge of an aquarium wall. The new terminal box includes a pair of terminals which are energized from a wall mounted transformer which converts normal household current from approximately 110 volts to approximately 3 volts. Subminiature lamp leads are attached to the low voltage terminals for energizing miniaturized submersible lamps with the entire system being totally safe since high voltages are eliminated from the vicinity of the aquarium. The high voltage source is confined to the wall outlet, a condition that is of course standard in every home, by use of a wall mounted transformer.

For a more complete understanding of the present invention, and a better application of its attendant advantages, reference should be made to the following detailed description taken in conjunction with the accompanying drawing.

DESCRIPTION OF THE DRAWING

FIG. 1 is a fragmentary perspective view of the corner of an aquarium showing the installation of the submersible underwater system of the present invention;

FIG. 2 is a cross-sectional view taken along lines 2—2 of FIG. 1, of the self-supporting terminal box of the invention;

FIG. 3 is a cross-sectional view of the new terminal box of the invention taken through a vertical plane thereof;

FIG. 4 is a cross-sectional view of the channel device of the present invention, taken along on 4—4 of FIG. 1, and;

FIG. 5 is a cross-sectional view taken along line 5—5 of FIG. 2, of the terminal box of the present invention.

DETAILED DESCRIPTION OF THE PRESENT INVENTION

Referring now to FIG. 1, the new underwater lighting system is illustrated in its installed position in association with an aquarium A having a side wall W. The new underwater lighting system comprises a wall-mounted, transformer unit 10, a low voltage terminal box 11, a telescoping channel 12, and a plurality of submersible lamps 13 controlled through a pushbutton "on-off" switch 14. In accordance with an important aspect of the invention, the terminal box 11 is self-supporting on the upper edge 16 of the aquarium wall W by virtue of its generally inverted U-shaped cross-section, while the transformer 10 is self-supporting directly from the face of a household wall outlet box by virtue of male prongs 9 which plug directly into the female outlet. The transformer, which is of conventional construction, reduces the 110–120 volt 60 cycle AC normally available at household outlet boxes to 3–3.5 volt, 0.6 amps, 60 cycle AC. The 3–3.5 volt supply is delivered to terminals 30 (FIG. 3) by conductors 8.

More specifically, and is shown best in FIG. 2, the terminal box 11 is comprised of two elements, a base element 20 and a cover element 21 which are telescopically associated with one another as shown. The base element 20 includes a horizontal bottom wall 22 joined with a vertical wall 24. The terminals 30, which may be in the form of self-locking, resilient brass spring clips, are fastened to the wall 24 by bolts 25 and hexagonal nuts 26, non-rotatably held in hexagonal recesses 27. A horizontal hanger wall 28 extends inwardly and terminates at a downwardly extending wall 29. A short lip 23 extends along the entire periphery of the base element 20 for overlapping the cover element 21 when it is nested.

As shown in FIGS. 2, 3, and 5, the cover element 21 includes a top wall 31 from which walls 32–37 depend. The edges of walls 32–37 as well as the converging side edges 38 of the top wall 31 nestingly engage the lip 23 when the base and cover elements 20, 21 are telescopically assembled.

The hanger wall 28 has channel walls 39 on the upper surfaces thereof for telescopic cooperation with a V-shaped channel 40 formed in top wall to establish a conduit 41. The channel 40 extends horizontally across the cover wall 31 and then downwardly, as indicated in FIGS. 2 and 3.

In accordance with the present invention, a plurality of submersible, sealed, miniaturized, low voltage lamps 13, are energized through elongated pairs of insulated conductors 42 extending outwardly therefrom. The bared ends of the conductors pairs are inserted into the spring clip terminals, which are advantageously separated by an insulation bar 45, to establish a lighting circuit which is controlled by the switch 14, as will be understood. Moreover, for enhanced appearance, the conductors 42 are retained in the vertical auxiliary telescoping channel 12, comprised of telescoping, matingly assembled, channel portions 43, 44 as shown in FIGS. 1 and 4. The channel 12 is selectively adjustable as to length by telescoping the two portions 43, 44 and it may be secured to the inner surface of the aquarium wall by means of an elastomeric suction cup 46 attached to an arm 47, integrally formed with the inner channel portion 43.

The safe underwater lighting system for aquariums herein illustrated and described is intended to be representative only, as certain changes may be made therein without departing from the clear teachings of the disclosure. Accordingly, reference should be made to the following appended claims in determining the full scope of the invention.

We claim:
1. A safe, electrical lighting system for aquariums and the like, comprising
 a. a transformer means including high voltage, input electrode means and low voltage output lead means;
 b. said electrode means being in the form of male plug means adapted to connect said transformer means directly to a 60 cycle AC source of approximately 110–120 volts and being further adapted to support said transformer means directly from female wall outlet means at said source;
 c. said transformer means being adapted to convert effectively an approximate 110–120 volt input applied to said plug means to a 3–3.5 volt AC output at said output lead means;
 d. said output lead means comprising a pair of wire conductors of substantial length;
 e. a hollow terminal box means formed from thermoplastic material and including integral hanger bracket means adapted to mount said terminal box means at the upper edge of an aquarium wall;
 f. a pair of low voltage conductor terminals supported within said box means;
 g. said output lead means being fastened to each of said terminals to establish a low voltage source in said terminal box;
 h. at least one submersible, miniaturized low voltage incandescent lamp means, having a pair of insulated lamp energizing conductors integral therewith; said conductors being adapted to connect said lamp means to said terminal means to energize said lamp means.

2. The system of claim 1, further including
 a. hollow elongated channel means formed from thermoplastic material and adapted to retain a plurality of said lamp energizing conductors therein;
 b. suction cup means adapted to hold said channel means against an inner aquarium wall surface.

3. The system of claim 2, further characterized in that
 a. said hollow channel means includes at least two cooperating telescoping elements which provide said channel means with a selectively adjustable length.

4. The system of claim 1, further characterized in that
 a. said terminal box means has an inverted U-shaped cross-section having first and second hollow legs;
 b. said legs being connected by horizontal hanger wall;
 c. said terminal box means thereby being adapted to be self-supporting when said legs straddle and said hanger wall rests upon an upper edge of an aquarium wall.

5. The system of claim 4, further characterized in that
 a. said terminal box comprises a base element and a cover element; and
 b. said base and cover elements are telescopically assembled in a manner wherein said cover element nests within peripheral lip walls of said base element.

6. The system of claim 5, further characterized in that
 a. said first leg has a top and three side walls formed by said cover element and a bottom and a fourth side wall formed by said base element;
 b. said second leg has a top and three side walls formed by said cover element and a fourth side wall formed by said base element;
 c. said cover top wall has channel formed therein on said top wall and in said rear wall cooperating with a pair of channel walls formed on the top and rear walls of said base element to form an L-shaped conduit for said lamp energizing conductors;
 d. said terminals are mounted on the rear wall of said first leg;
 e. said first leg is adapted to be mounted externally of an aquarium wall.

7. The system of claim 6, further characterized in that
 a. said first leg is longer than said second leg.

8. The system of claim 1, further characterized in that
 a. a switch means is included in series with said transformer means and said terminal box means.

9. The system of claim 6, further characterized in that
 a. said base element includes an integral spacer bar disposed between said terminals.

* * * * *